US 8,843,751 B2

(12) United States Patent
Camarillo et al.

(10) Patent No.: US 8,843,751 B2
(45) Date of Patent: Sep. 23, 2014

(54) IP ADDRESS DELEGATION

(75) Inventors: Gonzalo Camarillo, Helsinki (FI); Pekka Nikander, Jorvas (FI)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 758 days.

(21) Appl. No.: 12/920,209

(22) PCT Filed: Mar. 4, 2008

(86) PCT No.: PCT/EP2008/052634
§ 371 (c)(1),
(2), (4) Date: Aug. 30, 2010

(87) PCT Pub. No.: WO2009/109221
PCT Pub. Date: Sep. 11, 2009

(65) Prior Publication Data
US 2011/0004766 A1    Jan. 6, 2011

(51) Int. Cl.
*H04L 29/06* (2006.01)
*H04L 9/32* (2006.01)
*G06F 21/33* (2013.01)
*H04L 29/12* (2006.01)

(52) U.S. Cl.
CPC .......... *H04L 63/0823* (2013.01); *H04L 9/3263* (2013.01); *G06F 21/33* (2013.01); *H04L 29/1232* (2013.01); *H04L 29/12801* (2013.01); *H04L 29/12915* (2013.01); *H04L 61/2092* (2013.01); *H04L 61/6004* (2013.01); *H04L 61/6059* (2013.01)
USPC ........................................................ 713/176

(58) Field of Classification Search
CPC .... H04L 63/0823; H04L 9/3263; G06F 21/33
USPC ........................................................ 713/176
See application file for complete search history.

(56) References Cited

U.S. PATENT DOCUMENTS

| | | | |
|---|---|---|---|
| 6,976,164 B1 * | 12/2005 | King et al. | 713/156 |
| 2002/0133607 A1 | 9/2002 | Nikander | |
| 2006/0117179 A1 | 6/2006 | Karabulut | |
| 2007/0113075 A1 | 5/2007 | Jo et al. | |
| 2007/0242638 A1 * | 10/2007 | Arkko et al. | 370/331 |

(Continued)

FOREIGN PATENT DOCUMENTS

WO  WO 2006/018045 A1   2/2006

OTHER PUBLICATIONS

Aura, T. Cryptographically Generated Address (CGA). RFC 3972. Mar. 2005.

*Primary Examiner* — Michael S McNally

(57) ABSTRACT

A method of verifying a request made in respect of an IPv6 address comprising a network routing prefix and a cryptographically generated Interface Identifier. The request includes a delegation certificate containing a public key of the host, one or more further parameters or a formula or formulae for generating one or more further parameters, a specification of a range or set of IPv6 network routing prefixes, an identity of a delegated host, and a digital signature taken over at least the identity and the specification of a range or set of IPv6 network routing prefixes using a private key associated with the public key. The method verifies that the network routing prefix of said IPv6 address is contained within the specification, verifying that the public key and the further parameter(s) can be used to generate the cryptographically generated Interface Identifier, and verifying said signature using the public key.

11 Claims, 2 Drawing Sheets

(56) References Cited

U.S. PATENT DOCUMENTS

| | | | |
|---|---|---|---|
| 2007/0268919 A1* | 11/2007 | Sarikaya et al. | 370/401 |
| 2008/0307516 A1* | 12/2008 | Levy-Abegnoli et al. | 726/9 |
| 2010/0027465 A1* | 2/2010 | Ylitalo et al. | 370/328 |

* cited by examiner

IP ADDRESS DELEGATION

TECHNICAL FIELD

The present invention relates to IP address delegation and in particular to the delegation of responsibility for a Cryptographically Generated Address from a node owning that address to a further node.

BACKGROUND

IPv6 addresses are 128 bits in length. The first 64 bits of an address form a routing prefix which uniquely identifies the Internet access node (or so-called "local link") used by an IP terminal or node, whilst the last 64 bits form a host suffix which uniquely identifies the mobile terminal to the access node (or within the local link) The host suffix is referred to as an "interface identifier" as it identifies the host uniquely over the access interface. Typically, when a host registers with an access node, the host learns the routing prefix of the access node from an advertisement message sent from the access node. According to IETF RFC3041, a host then generates its interface identifier using a random number generated by the host. The host may additionally use a link layer address to generate the interface identifier, the link layer address being for example a MAC layer address used by the access network.

WO02/076060 describes how a node can generate a cryptographic version of the interface identifier using a one-way coding function, such as a hash function, and provide this to another peer user, who can then verify that the node is the owner of the interface identifier part of the IP address. Such cryptographically generated addresses are known as CGAs. CGAs provide a level of security to help prevent, for example, a denial of service attack, in which the attacker claims to be the owner of the IP address that the node wishes to use. The CGA approach has been standardised in IETF RFC3972 and is used inter alia in the Secure Neighbor Discovery (SeND) protocol standardised in IETF RFC 3971.

According to RFC 3972, CGAs are generated as follows:
Hash1=hash(modifier|prefix|public key|extensions)
IPv6 address=prefix|Hash1 (with certain bits set according to security level and other requirements).

Where "prefix" is the network routing prefix, "hash" is a cryptographic hash function (SHA-1), "public key" is a public key of the node generating the address, and "extensions" is a currently unused field for carrying standardised information. The "modifier" is a 128 bit value generated by the node to both increase security and enhance randomness. More particularly, depending upon the required security level, a modifier value is selected that results in a certain concatenation of data (including the modifier and the public key) hashing to a value ("Hash2") which has a specified number of "0"s in the leftmost bit positions.

In order to prove ownership of a CGA, a node must be able to provide a certificate containing the Interface Identifier (IID) part of the CGA address, the modifier, public key, and any extension, arranged as a CGA data structure. The certificate contains a digital signature (SHA-1) taken across the message to be sent (concatenated with a 128-bit CGA type tag) using the node's private key. A peer node receiving the certificate first computes Hash2 and verifies that it has the correct number of "0"s in the leftmost bit positions. If this is the case, it computes Hash1 and compares this to the IID, thereby verifying that the IID belongs to the public-private key pair, and then verifies the signature by reversing the signing process using the verified public key. This second step proves that the sender actually owns the public key and has not merely misappropriated it, as well as proving that the message originated from the claimed sender.

A host owning a CGA (the "delegating" node) may delegate responsibility for that address to some further node (the "delegated" node), for example to allow the delegated node to request that traffic be directed to the delegating node. This is achieved by providing the delegated node with a certificate containing the CGA, the CGA data structure, an identity of the delegated node, and a signature created using the delegating node's private key. In order to prove to a third party that it is allowed to use the claimed CGA, the delegated node provides the certificate to the third party which is able to verify that the IID belongs to the public key, and that the certificate is validly signed by the owner of the public key. In the case where said identity is the delegated node's public key, the delegated node may sign any request relating to the CGA with its private key, thus allowing the third party to prove that the delegated node owns the claimed identity.

A problem with this approach to delegation is that the certificate provided by the delegating node to the delegated node is tied to a single CGA. In the event that the delegating node changes its IPv6 address, e.g. due to mobility and its use of a new network routing prefix, a new certificate must be provided to the delegated node.

SUMMARY

According to a first aspect of the present invention there is provided a method of verifying a request made in respect of an IPv6 address comprising a network routing prefix and a cryptographically generated Interface Identifier. The request includes a delegation certificate containing at least a public key of said host, one or more further parameters or a formula or formulae for generating one or more further parameters, a specification of a range or set of IPv6 network routing prefixes, an identity of a delegated host, and a digital signature taken over at least said identity and said specification of a range or set of IPv6 network routing prefixes using a private key associated with said public key. The method comprises verifying that said network routing prefix of said IPv6 address is contained within said specification, verifying that said public key and said further parameter(s) can be used to generate said cryptographically generated Interface Identifier, and verifying said signature using said public key.

Embodiments of the present invention allow a host to delegate responsibility for IPv6 addresses to a further host, even when these addresses have not yet been generated. When an address is brought into use, subsequent signalling between the hosts is reduced or even eliminated.

According to a preferred embodiment, said one or more further parameters include a modifier which introduces a degree of randomness into the address generation process. More preferably, said certificate includes a formula for generating said modifier such that said modifier changes each time an Interface Identifier is generated. Said one or more further parameters may also include one or more extensions.

Said range or set of IPv6 network routing prefixes may be a subset of all available routing prefixes. Alternatively, said specification of a range or set of IPv6 network routing prefixes may specify all available routing prefixes, i.e. the certificate authorises the delegated node to act in respect of all routing prefixes.

Said step of verifying that said public key and said further parameter(s) can be used to generate said cryptographically generated Interface Identifier may comprise using said network routing prefix of the IPv6 address in the verification process, and employing a hashing algorithm. A hashing algorithm may also be used to verify said signature, using said public key.

According to a second aspect of the present invention there is provided an IPv6 host comprising a first processor configured to generate a delegation certificate, the certificate containing at least a public key of said host, one or more further parameters or a formula or formulae for generating one or more further parameters, a specification of a range or set of IPv6 network routing prefixes, an identity of a delegated host, and a digital signature taken over at least said identity and said specification of a range or set of IPv6 network routing prefixes using a private key associated with said public key. Said public key and said one or more further parameters can be used to compute an Interface Identifier part of a Cryptographically Generated Address. The host further comprises an output for providing said certificate to said delegated host, and a second processor configured to generate an Interface Identifier using at least said public key and said one or more further parameters, and to combine the Interface Identifier with a network routing prefix contained within said range or set of prefixes in order to generate a Cryptographically Generated Address. Said output may be further configured to send a notification to said delegated host when a Cryptographically Generated Address has been generated, the notification containing said Cryptographically Generated Address.

According to a third aspect of the present invention there is provided an IPv6 host comprising a first input for receiving from a peer IPv6 host a delegation certificate, the certificate containing at least a public key of said peer host, one or more further parameters or a formula or formulae for generating one or more further parameters, a specification of a range or set of IPv6 network routing prefixes, an identity of the receiving host, and a digital signature taken over at least said identity and said specification of a range or set of IPv6 network routing prefixes using a private key associated with said public key. The host further comprises a second input for receiving from said peer host a notification that the peer host is using a Cryptographically Generated Address mapping to said certificate, and an output for sending a request in respect of the Cryptographically Generated Address to a third party node and for including said certificate in the request.

According to a fourth aspect of the present invention there is provided computer storage medium on which is stored delegation certificate containing at least a public key of a host, one or more further parameters or a formula or formulae for generating one or more further parameters, a specification of a range or set of IPv6 network routing prefixes, an identity of a delegated host, and a digital signature taken over at least said identity and said specification of a range or set of IPv6 network routing prefixes using a private key associated with said public key.

DETAILED DESCRIPTION

In order to allow an IPv6 node or host (the "delegating" node) to be able to delegate responsibility for as yet undetermined Cryptographically Generated IP addresses (CGAs) to some further node (the "delegated" node), a mechanism is proposed here which involves generating at the delegating node a certificate which contains information required to generate those undetermined CGAs. The certificate includes a signature created with a private key of the delegating node, and is provided to the delegated node. By presenting the certificate to a third party, the delegated node is able subsequently to prove its delegated responsibility for the claimed CGA.

Figure 1:
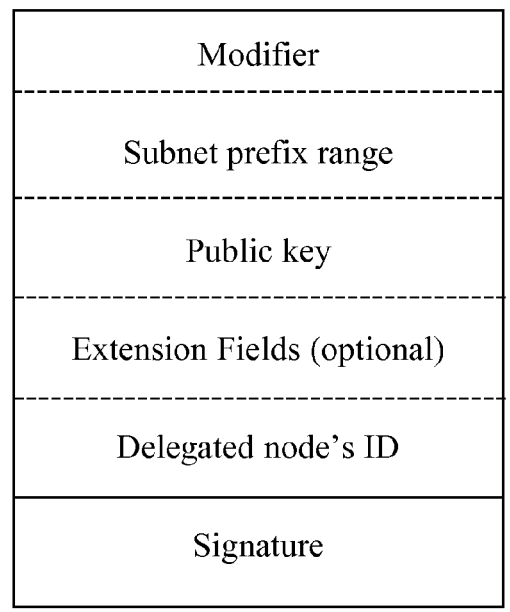
FIG. 1 illustrates schematically an example structure for a new CGA delegation certificate.

Considering the delegation mechanism in more detail, a node wishing to delegate responsibility for as yet undetermined CGAs generates a certificate having the data structure illustrated in FIG. 1. The certificate contains a new CGA data structure and an identity of the delegated node. This identity may be a public key belonging to the delegated node. The new data structure consists of a modifier, the delegating node's public key, any extensions, and a range, set, or other definition of permissible network routing prefixes. The permissible prefixes may be defined algorithmically, e.g. using a Bloom filter, or indeed the data structure may contain an indication that all prefixes are permissible. Rather than defining a single modifier value, the data structure may identify a means for generating a modifier, e.g. an algorithm or reference to an algorithm, whereby a modifier can be generated deterministically from known input values, e.g. the network routing prefix and the current time. If time is used, then the CGAs will be time-bound. A suitably coarse granularity should be used, e.g. in one hour intervals. Similarly, any used extensions may be defined algorithmically.

Assuming that the security level required for the CGA is set to its lowest value (i.e. sec=0 according to RFC3972), an algorithm for generating the modifier can be easily defined. More complex considerations arise when sec>0.

The delegating node includes in the certificate a signature created with its private key, and provides the certificate to the delegated node. This could be done by any appropriate mechanism, e.g. using the mechanism described in Section 6 of IETF RFC3972. As will be appreciated by those of skill in the art, the signature is bound to the CGA data structure. At some later point in time, the delegating node will generate a CGA for itself To do this it will, if necessary, generate the modifier (and any extensions) using the specified algorithm(s) and select or generate an appropriate network routing prefix and follow the procedure set out in Section 4 of RFC 3972.

At this time, the delegating node will notify the delegated node its new IPv6 address. Subsequently, when the delegated node wishes to request a third party node (the "verifying" node) to act in respect of the new CGA, the delegated node should include the certificate with the request. The verifying node performs the following actions in order to verify the request:

It extracts the network routing prefix from the CGA and verifies that it falls within any set or range defined in the CGA data structure of the certificate.

It then extracts or generates the modifier from the data structure, as well as extracting the delegating node's public key and any extension(s).

As the real collision count value used during CGA generation will not be known at the time of verification, the verifying node must set the collision count consecutively to 1, 1, and 2, and then perform the algorithm of Section 5 of IETF RFC3972 in order to verify that the CGA belongs to the delegating node's public key.

In the event that the CGA is correctly verified, the verifying node then attempts to verify that the signature contained within the certificate has been generated using the private key corresponding to the delegating node's public key.

In the event that the signature is correctly verified, the verifying node may attempt to verify that the sender of the request, i.e. the delegated node, is the owner of the identity contained within the certificate. Where that identity is a further public key, this may involve verifying a further signature contained within the request generated using the delegated node's private key.

Assuming that the security level is set to low, i.e. sec=0, there is no need for the verifying node to compute Hash2. However, if sec>0, the procedure described in steps 6 and 7, Section 5 of RFC3972 must be carried out.

Figure 2:
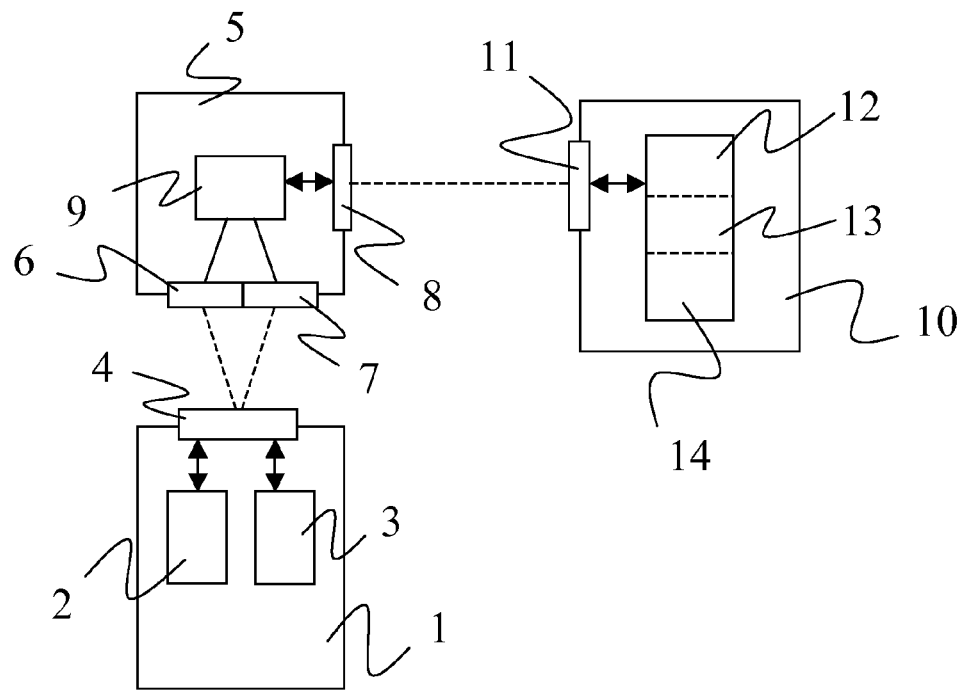
FIG. 2 illustrates schematically components of a communication system involved in the generation and use of a CGA delegation certificate.

FIG. 2 illustrates schematically delegating node 1 and which comprises a first processor 2 configured to generate a delegation certificate as described above. A second processor 3 is configured to generate a CGA using the parameters contained within said certificate. Both the certificate and a notification of CGA generation are sent via an output 4 to a delegated node 5. This node 5 receives the certificate at a first input 6, and receives notifications at a second input 7. A processor 9 is responsible for generating requests in respect of a delegated CGA and for sending these to a verifying node 10, together with the certificate. Requests are received by the verifying node 10 at an input 11. A three stage verification process is performed on the certificate, namely: verify routing prefix is within range 12, verify IID matches public key 13, and verify signature 14.

Figure 3:
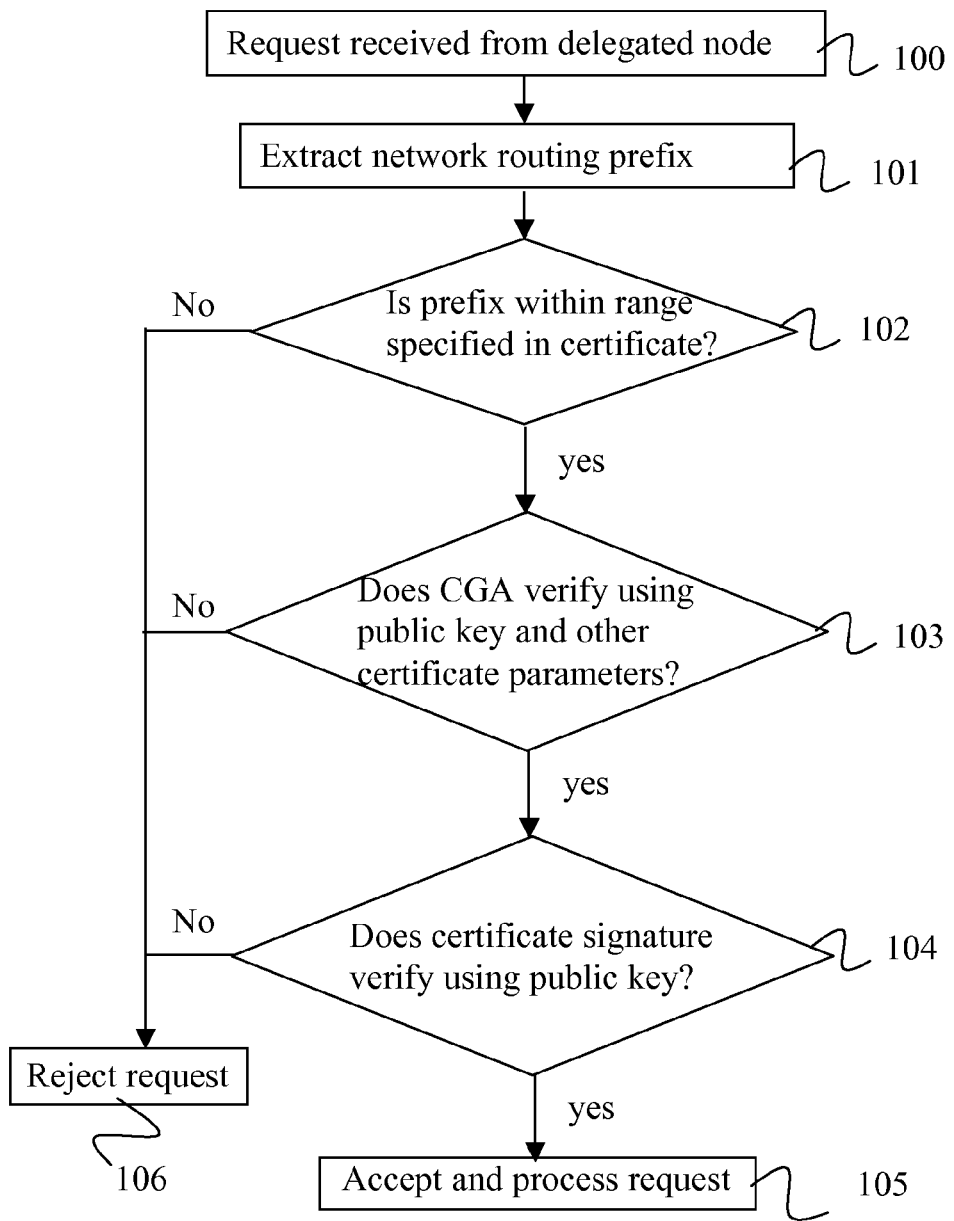
FIG. 3 is a flow diagram illustrating a process for validating a request made in respect of an IPv6 address.

FIG. 3 is a flow diagram illustrating a process for verifying a certificate. The steps illustrated comprise receiving a request (in respect of a CGA) at a verifying node from a delegated node (step 100), extracting the routing prefix from the CGA (step 101), verifying that the routing prefix is within the range specified in the certificate (step 102), verifying the IID of the CGA (step 103), and verifying the signature (step 104). If the verification fails at any step, the request is rejected (step 106). If all verification steps are successful, the request is accepted and processed (step 105).

It will be appreciated by the person of skill in the art that various modifications may be made to the above described embodiments without departing from the scope of the present invention.

The invention claimed is:

1. A method of verifying a request made by a host in respect of an Internet Protocol v6 (IPv6) address comprising a network routing prefix and a cryptographically generated Interface Identifier, the request including a delegation certificate containing at least a public key of said host, one or more further parameters, a specification of one of a range or set of IPv6 network routing prefixes, an identity of a delegated host, and a digital signature taken over at least said identity and said specification of a range or set of IPv6 network routing prefixes using a private key associated with said public key, the method comprising:
   verifying that said network routing prefix of said IPv6 address is contained within said specification;
   verifying that said public key and said further parameter(s) can be used to generate said cryptographically generated Interface Identifier; and
   verifying said signature using said public key.

2. The method according to claim 1, wherein said one or more further parameters include a modifier.

3. The method according to claim 2, wherein said certificate includes a formula for generating said modifier such that said modifier changes each time an Interface Identifier is generated.

4. The method according to claim 1, wherein said one or more further parameters include one or more extensions.

5. The method according to claim 1, wherein said range or set of IPv6 network routing prefixes is a subset of all available routing prefixes.

6. The method according to claim 1, wherein said specification of a range or set of IPv6 network routing prefixes specifies all available routing prefixes.

7. The method according to claim 1, wherein said step of verifying that said public key and said further parameter(s) can be used to generate said cryptographically generated Interface Identifier comprises using said network routing prefix of the IPv6 address in the verification process.

8. The method according to claim 1, wherein said steps of verifying that said public key and said further parameter(s) can be used to generate said cryptographically generated Interface Identifier and to verify said signature using said public key, each utilizing a hashing algorithm.

9. An Internet Protocol v6 (IPv6) host comprising:
   a first processor configured to generate a delegation certificate, the certificate containing at least a public key of said host, one or more further parameters, a specification of one of a range or set of IPv6 network routing prefixes, an identity of a delegated host, and a digital signature taken over at least said identity and said specification of a range or set of IPv6 network routing prefixes using a private key associated with said public key, wherein said public key and said one or more further parameters can be used to compute an Interface Identifier part of a Cryptographically Generated Address;
   an output for providing said certificate to said delegated host; and
   a second processor configured to generate an Interface Identifier using said public key and said one or more further parameters, and to combine the Interface Identifier with a network routing prefix contained within said range or set of prefixes in order to generate a Cryptographically Generated Address.

10. The IPv6 host according to claim 9, wherein said output is further configured to send a notification to said delegated host when a Cryptographically Generated Address has been generated, the notification containing said Cryptographically Generated Address.

11. An Internet Protocol v6 (IPv6) host comprising:
   a first input for receiving from a peer IPv6 host a delegation certificate, the certificate containing at least a public key of said peer host, one or more further parameters or a formula or formulae for generating one or more further parameters, a specification of one of a range or set of IPv6 network routing prefixes, an identity of the receiving host, and a digital signature taken over at least said identity and said specification of a range or set of IPv6 network routing prefixes using a private key associated with said public key;
   a second input for receiving from said peer host a notification that the peer host is using a Cryptographically Generated Address mapping to said certificate; and
   an output for sending a request in respect of the Cryptographically Generated Address to a third party node and for including said certificate in the request.

* * * * *